Jan. 3, 1928.
J. F. NEWSOM
1,655,195
WINDOW MUFFLER
Filed Aug. 6, 1925 2 Sheets-Sheet 1
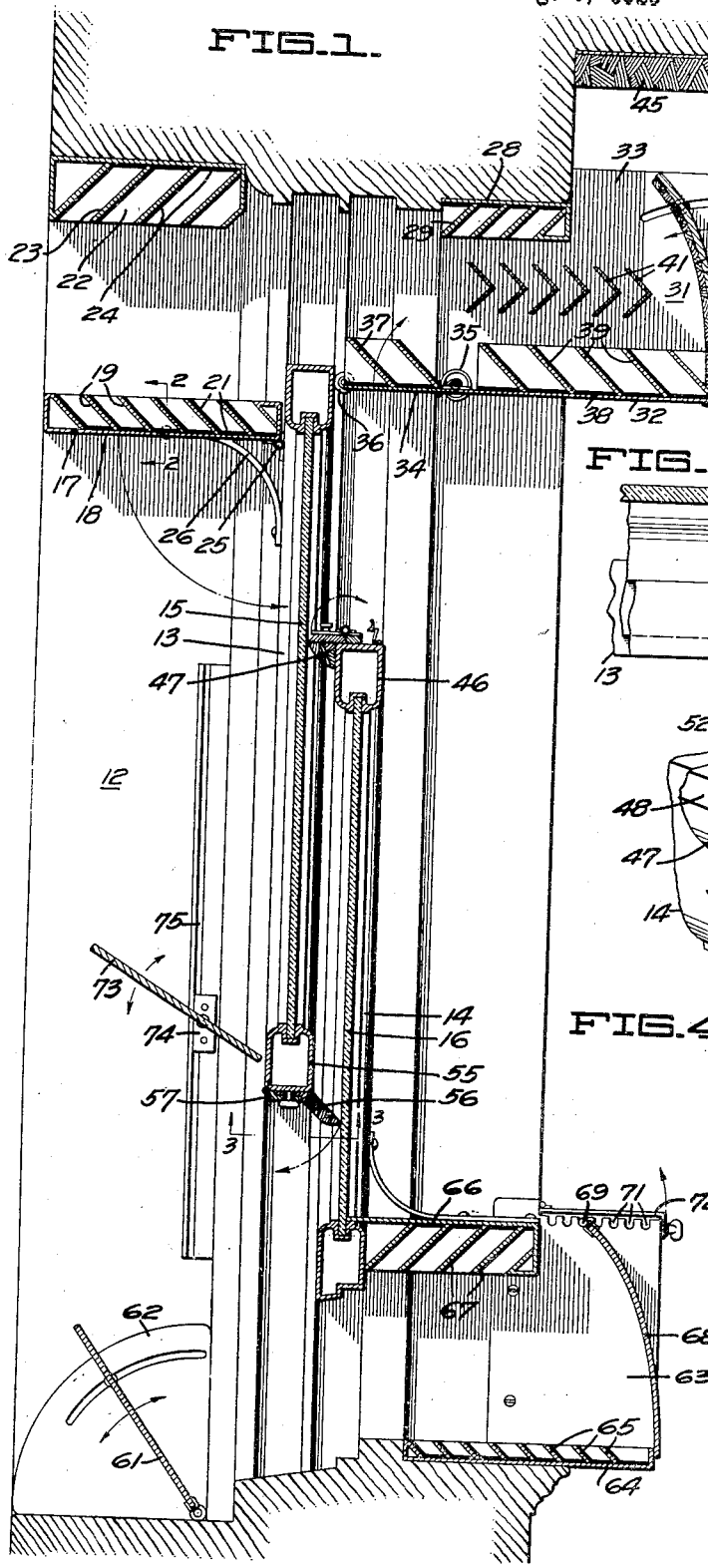
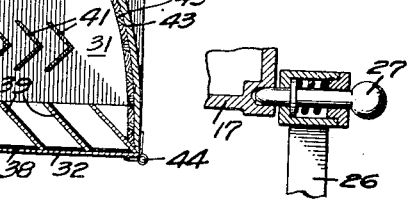
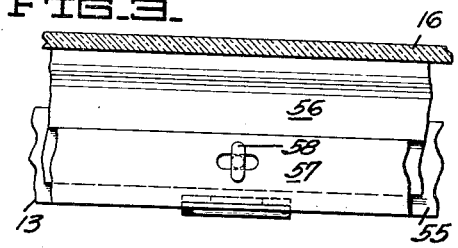
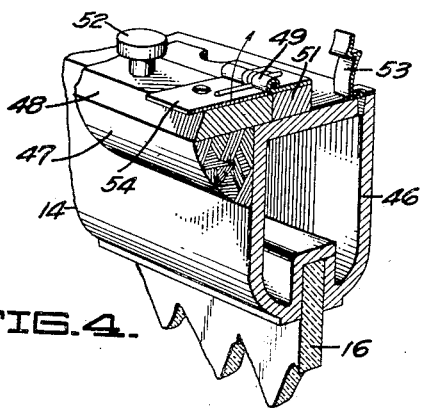
INVENTOR
John F. Newsom.
BY White & Prost
his ATTORNEYS Jan. 3, 1928.  1,655,195
J. F. NEWSOM
WINDOW MUFFLER
Filed Aug. 6, 1925   2 Sheets-Sheet 2

INVENTOR
John F. Newsom.
BY White &Prot
his ATTORNEYS

Patented Jan. 3, 1928.

1,655,195

UNITED STATES PATENT OFFICE.

JOHN F. NEWSOM, OF PALO ALTO, CALIFORNIA.

WINDOW MUFFLER.

Application filed August 6, 1925. Serial No. 48,616.

The invention relates to means for minimizing or reducing the volume of sound entering a room or apartment through a ventilating opening.

An object of the invention is to provide means for intercepting the sound waves traveling toward or through the ventilating opening to reduce the sound disturbance in the room.

Another object of the invention is to provide a sound muffler constructed to reflect and absorb the sound waves either before or after they have passed through the opening or both before and after they pass through the opening, to minimize the sound disturbance within the room.

Another object of the invention is to provide a sound muffler for use in connection with a window having a vertically slidable sash.

Another object of the invention is to provide means for preventing the passage of sound through the space between the overlapping portions of the sashes when one or both of the sashes have been moved to provide ventilating openings.

Another object of the invention is to provide a sound muffler for use in connection with windows having vertically slidable sashes, which muffler operates to reduce the volume of sound passing through the window opening and at the same time permits free movement of the sashes.

The invention possesses other advantageous features, some of which with the foregoing will be set forth at length in the following description where I shall outline in full that form of the invention which I have selected for illustration in the drawings accompanying and forming part of the present specification. In said drawings I have shown several forms of devices embodying my invention, but it is to be understood that I do not limit myself to such forms, since the invention as set forth in the claims, may be embodied in a plurality of forms.

The roar of sound from the street which enters the open windows of office buildings, hotels, hospitals and homes is very annoying and it is an object of the present invention to intercept the sound waves which ordinarily enter the room through open windows and thus reduce and minimize the annoyance. These sound waves emanate principally from certain sources in the street, such as street car tracks and crossings and moving street cars, and automobile horns, and the device of my invention is arranged to intercept the direct sound waves from these sources and also to intercept reflected sound waves which are directed toward the opening in the window. Noises also enter rooms through open transoms and other openings provided for establishing ventilation. By eliminating or reducing the intensity of these sound waves, the volume of sound entering the room is very greatly reduced and the annoying effect of the loud and harsh sounds is practically eliminated.

Efforts made in the past to minimize the effect of outside noises which enter rooms have consisted of reflectors arranged to place the window opening in the sound shadow, or of sound absorbents in the room, placed on the ceilings and walls thereof, to absorb the sound energy after it has passed into and spread through the room; whereas in my invention I deal with and nullify the objectional effects of the entering sound while the sound energy is in the immediate proximity of the window opening, in its most confined space and where in consequence devices for nullifying its effect can be most efficiently brought to bear upon it.

In accordance with my invention I arrange sound muffling or nullifying means adjacent the opening, so that the sound waves are acted upon while they are confined to a small area. These devices comprise a sound shield on the outside of the opening or window, to intercept sound traveling toward the opening, and devices arranged within the opening or within the room adjacent the opening to either absorb or reflect back through the opening, or both absorb and reflect back, sound waves which pass through the opening. These absorbing or reflecting devices are arranged in the opening, or within the room adjacent the opening, so that they are in the path of the waves passing through the confined space of the opening, so that a large portion of the sound which passes through the opening is either reflected back through the opening or absorbed, or both. These devices are arranged to permit of ventilation through the opening and are so arranged as to minimize the amount of sound which enters the room.

Several forms of devices for accomplishing this result are shown in the accompanying drawings, in which Figure 1 is a vertical section through a sliding sash window, provided at the top with means for absorbing and reflecting back sound waves which would otherwise enter the room through the opening, and at the bottom with similar devices, and further provided with means for preventing the travel of sound through the space between the overlapping portions of the sashes.

Figure 2 is a section taken on the line 2—2 Figure 1, showing the means employed for holding the sound reflector and absorber in operative position.

Figure 3 is a section taken on the line 3—3 Figure 1, showing the means for holding the sound intercepting device in operative position.

Figure 4 is a sectional elevation, in perspective, of the upper rail of the lower sash.

Figures 5, 6:
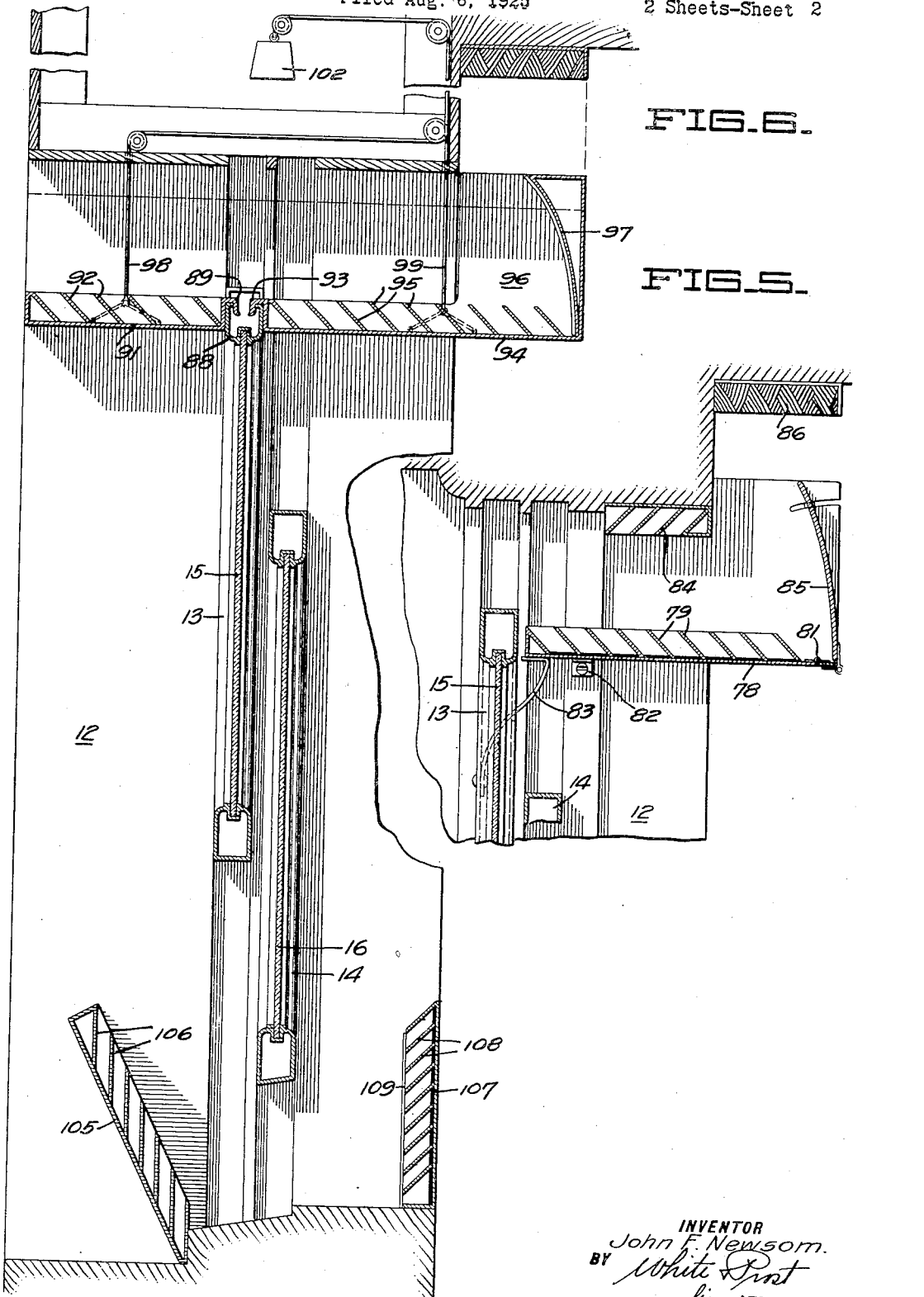
Figure 5 is a section through the upper portion of a window opening, showing a modified form of means for absorbing and reflecting the sound waves which pass through the opening.
Figure 6 is a vertical section through a sliding sash window, showing means mounted on the upper sash for absorbing and reflecting sound waves which pass through the opening and showing means at the bottom of the window for minimizing the volume of sound which will enter the room through the bottom opening.

The device of my invention is constructed to reduce to a minimum the amount of sound entering a room through a window opened to provide ventilation. This is accomplished by a combination of sound interceptors which first reduce the amount of sound passing through the opening and then intercept the reduced volume of sound which has passed through the opening at a point adjacent the opening, and thus prevent the sound from entering the room. The device for accomplishing this result may be arranged in various combinations and in order to minimize the sound which enters the room, combinations of devices must be employed, and in the various figures of the drawings I have shown various combinations which cooperate in different ways to produce the desired result. In Figure 1 I have shown a window opening 12, provided with an upper vertically slidable sash 13 and a lower vertically slidable sash 14. The upper sash is provided with a glass 15 and the lower sash is provided with a glass 16. The sliding sashes are provided with suitable counterweights (not shown) for the purpose of holding them in vertically adjusted positions. Means are provided for reducing the volume of sound which may enter the room through the opening above the upper sash, through the opening below the lower sash, and through the space between the overlapping portions of the two sashes.

Mounted on the outside of the upper sash 13, adjacent the top rail thereof, is a sound reflecting and absorbing member 17, which preferably comprises a box-like structure, the under surface 18 of which serves as a sound reflector or interceptor to place the opening above the sash in the sound shadow. Sound ordinarily originates from a source below the window and travels upwardly toward the window opening, so that the intercepting surface 18 places the window opening in the sound shadow. A portion of the sound will pass around the outer end of the structure 17 and travel toward the opening above the sash. The volume of this sound is reduced by inclined vanes 19 arranged within the box-like structure 17. The pockets formed by these vanes are preferably lined with a sound absorbing material 21, such as felt, so that the sound energy which is directed into the pocket is substantially absorbed. Any energy which is reflected is directed outwardly away from the opening. Arranged in the window opening above the structure 17 is a similar box-like structure 22 having downwardly and outwardly inclined vanes 23, forming pockets which are lined with sound absorbing material 24. This structure also acts to receive, reflect or absorb a portion of the sound energy, so that only a portion of the sound energy which passes inward past the outer edges of these structures, reaches the opening above the sash. For the purpose of convenience, and particularly the convenience of a person washing the outer surfaces of the glasses in the sashes 13 and 14, the structure 17 is pivoted to the sash 13 at 25, and is normally held in horizontal position by the brackets 26 arranged at opposite sides of the sash. Suitable spring pressed catches 27 (Figure 2) may be employed to support the structure 17 in horizontal position. When the catches are withdrawn the structure 17 will move to a vertical position and will not interfere with a person standing on the outer window ledge.

Means are provided for absorbing and reflecting back through the opening above the sash, the major portion of the sound which passes inward through said opening. Arranged in the upper portion of the window opening on the inside of the sash, is a box-like structure 28 having inclined vanes 29 covered with sound absorbing material, which serves substantially the same purpose as the structure 22. Arranged in the opening on the inside of the sash and fixed in position to the wall, is a box-like structure 31 having a bottom 32 and side walls 33. That portion of the bottom 34 which lies over the lower sash 14 is hinged so that it may move upward to permit the lower sash to be raised to its limit. The portion 34 is normally held in horizontal position by the spring 35 at the hinge but is free to move upward when urged by the lower sash. To prevent this hinged portion of the bottom from wedging the lower sash in its top position, the section 34 of the bottom is provided at its outer end with a roller 36 which rolls against the side of the sash, thereby permitting downward movement of the sash. The segment 34 is provided on its upper surface with a plurality of inclined vanes 37 which are covered with sound absorbent material. Resting on the bottom 32 is a tray 38 having inclined vanes 39 thereon covered with sound absorbent material. This tray may readily be removed to remove any accumulated dust therefrom. The vanes 29 and 39 serve to further reduce the amount of sound which may pass through the opening and this amount may be further reduced by the vanes 41 arranged between the vanes 29 and 39. The various vanes are preferably made of a non-resonant material, so that a maximum sound nullifying effect is produced. The box-like structure 33 preferably extends into the room and the upper edge thereof is spaced from the ceiling 42 of the room so that ample space is left for ventilation. The inner end of the box-like structure is closed by the curved plate 43 which is preferably covered with a layer of sound deadening material 43ª and which is pivoted at 44 so that the plate may be set in any desired adjusted position to deaden the major portion of the sound which passes the sound nullifying devices. When desired the sound deadening layer 43ª may be omitted so that the plate 43 serves to reflect sound backward through the window opening. The only sound which may escape from the box-like structure passes upwardly therefrom against the sound absorbing device 45, arranged at the ceiling, so that substantially all of the energy is subtracted from the sound waves before they are released in the room. The plate 43 is also made non-resonant and is positioned to reflect back through the opening sound which reaches it.

Means are provided for preventing the passage of sound into the room through the space between the overlapping sashes. This is accomplished by the provision of filling strips which close the gap between the top rail of the lower sash and the glass in the upper sash, and between the bottom rail in the upper sash and the glass in the lower sash. Arranged on the top rail 46 of the lower sash is a filler strip 47, preferably formed of felt, which fills the gap between the rail 46 and the glass 15. To permit the lower sash to be raised above the upper sash, this filler strip is preferably pivotally supported on the rail 46 so that it may be turned backward out of the path of the upper rail of the upper sash. For this purpose the strip 47 is preferably secured to a hinge strip 48 which is hinged at 49 to a block 51 secured to the top rail 46. A button 52 is provided for turning the pivot strip 48 about its pivot and a spring keeper 53 is arranged to be engaged by a finger 54 on the pivot strip to hold the filler strip 47 in inoperative position. The gap between the lower rail 55 of the upper sash and the glass 16 is filled by a felt strip 56 attached to the lower rail 55 and engaging the glass 16. The strip 56 is preferably secured to a hinged strip 57 which is normally held in position by a turn-button 58, which is associated with an elongated slot in the strip 57, so that by turning the button the filler strip 56 may be swung down away from contact with the glass 16.

At the bottom of the opening in the wall, an angularly adjustable sound shield or reflector 61 is arranged between the side boards 62 on the outside of the sash, so that the ventilating opening below the lower sash is placed in the sound shadow. The shield 61 may be placed in any desired angular position, depending upon the location of the source of sound. Some sound will pass over the shield 61 and through the ventilating opening and means are provided for absorbing the major portion of the energy of this sound, so that a minimum of the sound will enter the room. Arranged in the opening in the wall, on the inside of the sash, is a box-like structure having side walls 63 and a bottom wall 64, the bottom wall being provided with inclined vanes 65 forming pockets which are lined with sound absorbing material. Mounted on the lower sash, adjacent the lower rail thereof, is a box-like structure 66 having inclined vanes 67 thereon forming pockets which are lined with sound absorbing material. The vanes 65 and 67 operate to entrap a portion of the sound energy thereby reducing the volume of sound passing through the box. The box is closed at its inner end by a curved reflector 68 which may be arranged in adjusted position to reflect backward through the opening the sound which reaches it. The reflector 68 is preferably formed at its upper end with a crossrod 69 which may be seated in any one of a series of depressions 71 in the upper edges of the side walls 63, to accomplish the desired adjustment of the reflector. The crossrod 69 is held in the selected depression by a clamping bar 72, overlying the depression.

Means are also provided for preventing sound reflected downwardly from the reflecting surface 18, from being directed into the lower window opening. This means comprises a sound shield 73 arranged in the opening on the outside of the sash and positioned to intercept sound reflected from the shield 18 and directed toward the lower window opening. This shield 73 also serves the purpose of causing interference of the sound waves which pass through the lower opening. The reflector 73 is preferably pivotally mounted on a block 74 which is vertically slidable in the guide rail 75 and which may be secured in any desired vertical position. The distance between the shield 73 and the upper edge of the shield 61 and the angle of the shield, are adjusted so that the usual long waves which constitute the major portion of sound disturbance from the street, will be reflected by the shield 73 toward the lower opening in the window and be displaced approximately one-half wave length with respect to the sound which passes directly over the edge of the shield 61. There will therefore be present sound waves having directly opposite vibrations, thereby causing interference and nullification of the sound.

In Figure 5 I have shown a modified form of sound absorbing and reflecting device arranged on the inside of the opening at the upper portion thereof. The box-like structure 78 which is provided with the inclined vanes 79, of the same general arrangement as the vanes 39 in Figure 1, is pivoted at its inner end on the hinge 81 and normally rests, adjacent its outer end on the stop 82 arranged at each side of the opening. In order that a maximum of illumination may be provided within the room when the upper sash is raised to its upper limit, means are provided for tilting the structure 78 upward so that it will not interfere with the passage of light into the room. For this purpose the upper sash 13 is provided adjacent its upper end with a resilient projection or finger 83 which engages under the outer end of the structure 78 and moves such structure about the pivot 81, as the upper sash is raised. This arrangement also preferably embodies the vanes 84, which serve the same purpose as the vanes 29 in Figure 1, and the reflector 85 which serves the same function as the reflector 43 in Figure 1, and the pad of sound absorbing material 86 which is the equivalent of the pad 45 in Figure 1.

In Figure 6 I have shown a modified form of structure in which the sound absorbing devices controlling the sound passing through the upper opening, are mounted on the upper rail 88 of the upper sash, so that they move vertically with the sash. Detachably attached to the rail 88, as by means of the hook 89, is a horizontally disposed tray 91, having inclined vanes 92 which form absorbing pockets. Detachably attached to the upper rail 88, as by the hook 93, and lying on the inside of the sash, is a tray 94 having inclined vanes 95 forming sound absorbing pockets and having its side wall 96 at the inner end thereof extended upwardly to form a box-like structure which is closed at the inner end by the curved reflector 97. The trays 91 and 94 are connected by the cords 98 and 99 to a suitably arranged counterweight 102, so that the trays move simultaneously with the sash 13.

At the bottom of the opening a shield 105 is arranged on the outside of the sash, to place the ventilating opening in the sound shadow. The shield is provided on its inner side with a plurality of vanes 106 which are inclined to the path of the sound which passes around the outer edge of the shield and toward the ventilating opening. A portion of the sound energy is subtracted and reflected by these vanes, thereby reducing the volume of sound which passes through the ventilating opening. Arranged on the inside of the sash, adjacent the ventilating opening and spaced therefrom, is a sound reflector or nullifying device comprising a plate 107 having a plurality of downwardly inclined vanes 108 on its outer surface. These vanes form pockets which are preferably lined with sound absorbing material, so that the major portion of the sound which reaches the vanes is absorbed. The reflected sound is directed from the pocket toward the ventilating opening and out therethrough. The plate 107 and the vanes 108 are preferably made of a non-vibrant or non-resonant material, so that the amount of sound disturbance in the room is reduced to a minimum. The vanes 108 may be connected together at their outer edges, at spaced portions, by strips of metal or other material 109, to prevent vibration of the vanes. The exclusion of sound from a room, while providing ventilation, presents many problems and requires various instrumentalities for its accomplishment. This is partly caused by the characteristic of sound waves, of forming new loci at every point that the direction of travel is interfered with, this phenomena being popularly known as the ability of sound waves to travel around a corner.

I claim:

1. The combination with a wall having an opening, a window sash arranged in said opening and means carried by the sash for minimizing the sound entering through the opening formed by opening the window.

2. The combination with a wall having an opening, a window sash arranged in said opening, and a sound receiving and absorbing device carried by the sash to minimize the sound entering through the window.

3. The combination with a wall having an opening, a window sash arranged in said opening and a sound absorbing device carried by the sash and extending outwardly therefrom to intercept and minimize the sound entering through the open window.

4. The combination with a wall having an opening, a window sash arranged in said opening, a sound absorbing device carried by the sash and extending outwardly therefrom and a sound absorbing device arranged within the opening adjacent the top thereof and cooperating with said first device to minimize the sound entering through the open window when the sash is lowered.

5. The combination with a wall having an opening, a window sash arranged in said opening, a sound absorbing device pivotally carried by the sash and extending outwardly therefrom and means for latching the pivoted device in operative position.

6. The combination with a wall having an opening, a window sash arranged in said opening, sound absorbing devices arranged at the top of the opening on the inside with respect to the sash and a sound shield arranged to receive the sound which passes the sound absorbing devices.

7. The combination with a wall having an opening. of a vertically slidable window sash arranged in said opening, brackets secured to said sash and a sound shield pivoted to said sash and supported by said brackets.

8. The combination with a wall having an opening, of a vertically slidable window sash arranged in said opening, a box-like structure arranged within the opening at the top, said structure being open at the ends and top, sound absorbing devices arranged within said structure and a sound deflector closing the inner end of said structure.

9. The combination with a wall having an opening, of a vertically slidable window sash arranged in said opening, an open-top box-like structure arranged within the opening at the top and attached to the sash and sound absorbing devices in said structure.

10. The combination with a wall having an opening, of a vertically slidable window sash arranged in the opening, an open-top box-like structure arranged within the opening at the top and attached to the sash, sound absorbing devices in said structure and a sound deflector carried by said structure and arranged to intercept sound waves which pass the sound absorbing devices.

11. The combination with a wall having an opening, of a vertically slidable window sash arranged in the opening, a sound absorbing device carried by and arranged on the inner side of said sash and a sound shield arranged in the opening in front of the sash.

12. The combination with a wall having an opening, of a vertically slidable window sash arranged in the opening, a sound absorbing device arranged in the opening on the inner side of the sash, to intercept sound waves passing the bottom rail of the sash, a sound deflector arranged to deflect the sound waves which pass the sound absorbing device and a sound shield arranged in the opening on the outside of the sash.

13. The combination with a wall having an opening, of a vertically slidable window sash arranged in the opening, a box-like structure arranged in the opening on the outside of the sash, an angularly adjustable sound shield in said structure, a box-like structure arranged in the opening on the inside of the sash and an angularly adjustable sound shield arranged in the latter structure.

14. The combination with a wall having an opening, of a vertically slidable window sash arranged in the opening, a box-like structure arranged in the opening on the outside of the sash, an angularly adjustable sound shield in said structure, a box-like structure arranged in the opening on the inside of the sash, sound absorbing means arranged in the latter structure and an angularly adjustable sound reflector arranged to intercept sound waves which pass the sound absorbing means.

15. The combination with a wall having an opening, of a pair of vertically slidable window sashes arranged in the opening, means arranged adjacent the top of the upper sash for intercepting sound travelling toward the top of the opening, means arranged adjacent the bottom of the opening for intercepting sound travelling toward the bottom of the opening and an inclined, vertically adjustable shield interposed between said means.

16. The combination with a wall having an opening, of a pair of vertically slidable window sashes arranged in the opening, means arranged adjacent the top of the upper sash for intercepting sound travelling toward the top of the opening, means arranged adjacent the bottom of the opening for intercepting sound travelling toward the bottom of the opening and a vertically adjustable reflector extending outward from the upper sash and arranged above said lower means.

17. The combination with a wall having an opening, of a vertically slidable window sash arranged in the opening, a sound shield arranged to intercept sound waves travelling toward the opening at the bottom and means above the shield for reflecting portions of the same sound waves toward the opening at the bottom, said reflecting means being positioned so that the waves reflected therefrom are spaced one-half wave length from the waves which pass over the edge of the shield toward the opening.

18. The combination with a wall having an opening, of a vertically slidable window sash arranged in the opening, a sound nullifying device pivoted on the inside of the opening below the top of the opening and lying in the path of the sash whereby upward movement of the sash to the top of the opening causes said device to rock on its pivot.

19. The combination with a wall having an opening of a sound reflector arranged adjacent the opening to reflect sound to the opening, the reflector being so arranged with respect to the opening and the source of the sound that the reflected waves interfere with the sound waves coming directly from the source.

20. The combination with a wall having an opening, of a sound shield spaced from the opening and interposed between the opening and the source of sound, whereby some sound waves will pass the shield and reach the opening and a sound reflector so arranged with respect to the opening and the source of sound that the reflected waves interfere with the sound waves which pass the shield.

21. The combination with a wall having an opening, of a pair of vertically slidable window sashes in the opening adapted to be moved to overlapping position to open the window and a filler strip of sound deadening material attached to the rail of one sash and closing the space between the said rail and the glass of the other sash when the sashes are in overlapping position, said strip being pivotally attached to said rail whereby the strip may be turned back out of the path of the rail of the other sash.

In testimony whereof, I have hereunto set my hand.

JOHN F. NEWSOM.